United States Patent [19]

Grimes et al.

[11] Patent Number: 5,463,623
[45] Date of Patent: * Oct. 31, 1995

[54] INTEGRATED WIRELESS TELECOMMUNICATION AND LOCAL AREA NETWORK SYSTEM

[75] Inventors: Gary J. Grimes, Thornton; Thomas M. Quinn, Boulder, both of Colo.

[73] Assignee: AT&T IPM Corp., Coral Gables, Fla.

[ * ] Notice: The portion of the term of this patent subsequent to Dec. 22, 2010, has been disclaimed.

[21] Appl. No.: 738,415

[22] Filed: Jul. 31, 1991

[51] Int. Cl.⁶ ................................................. H04L 12/28
[52] U.S. Cl. ........................ 370/79; 370/95.3; 370/94.1
[58] Field of Search ............................ 370/82, 84, 85.7, 370/79, 95.1, 95.3, 94.1, 94.2, 60, 60.1, 85.15, 110.1, 56; 379/56

[56] References Cited

U.S. PATENT DOCUMENTS

| | | | |
|---|---|---|---|
| 4,456,793 | 6/1984 | Baker et al. | 379/56 |
| 4,789,983 | 12/1988 | Acampora et al. | 370/84 |
| 4,855,995 | 8/1989 | Hiyama et al. | 370/85.15 |
| 4,926,420 | 5/1990 | Shimizu | 370/94.1 |
| 4,959,874 | 9/1990 | Saruta et al. | 455/601 |
| 5,046,066 | 9/1991 | Meisenger | 370/94.1 |
| 5,056,088 | 10/1991 | Price et al. | 370/94.1 |
| 5,124,985 | 6/1992 | Hoshikawa | 370/95.3 |
| 5,208,811 | 5/1993 | Kashio | 370/110.1 |

FOREIGN PATENT DOCUMENTS 9009072  8/1990  WIPO .............................. H04M 1/72

Primary Examiner—Douglas W. Olms
Assistant Examiner—Chau T. Nguyen
Attorney, Agent, or Firm—John C. Moran

[57] ABSTRACT

A system combining LAN and telecommunication capabilities to provide a high speed wireless LAN capability and to simultaneously provide wireless ISDN capability within an office. The LAN and ISDN information is communicated over a common transmission medium. The system also allow a user to interconnect wireless ISDN digital terminals to any other ISDN equipment anywhere in a PBX switch system or the public network. The system provides for communication of information between wireless LAN units and ISDN equipment. For example, this function allows a local computer using a local LAN interface to communicate with a remote computer via ISDN switching facilities. Further, the expense of hiding unsightly wiring in an office environment can be avoided, and the cost of moves and rearrangements of equipment can be greatly minimized.

20 Claims, 3 Drawing Sheets

WIRELESS FRAME

INTEGRATED WIRELESS TELECOMMUNICATION AND LOCAL AREA NETWORK SYSTEM

TECHNICAL FIELD

This invention relates to communicating information and, in particular, to communicating telecommunication and computer data by utilizing a radio frequency or light transmission spectrum.

BACKGROUND OF THE INVENTION

In today's office, proliferation of many different types of telecommunications and computer-related equipment has created a number of problems. For example, computers and computer-related equipment (such as printers, data terminals, and file servers) are often interconnected by direct wiring or local area networks (LANs). Such LANs may use either wire or wireless communication paths. On the other hand, telecommunication equipment is also interconnected to telecommunication switching systems such as central offices or private branch exchanges (PBXs) by wire or wireless techniques. Prior art wireless telecommunication arrangements (such as cordless or cellular telephones) suffer from a problem of insufficient communication spectrum to accommodate the amount of telecommunication equipment used in a modem business site having a large number of private and group offices. Further, the prior art LAN and telecommunication systems are separate and distinct. Within the same office, this often results in having one data terminal connected to the LAN system and another data terminal (that is of the same type as the one connected to the LAN system) connected to the telecommunication system. The other terminal provides access to a remote computer system; whereas, the data terminal attached to the LAN is providing access to local equipment. With the advent of ISDN, telecommunication systems have increased data switching capacity for remote connection use and have better service capabilities. The result is that the use of two distinct transport systems within an office has become less acceptable because of increasing use of ISDN facilities to communicate data over large distances with data destined for equipment interconnected to a LAN.

A second problem is the large amount of cabling needed to interconnect equipment to these two transport systems within a private office. The cabling is expensive to install initially and to change during subsequent relocation of equipment within the office. Further, such cabling is unsightly and unacceptable in many office environments.

SUMMARY OF THE INVENTION

The forementioned problems are solved and a technical advance is achieved in the an by an apparatus and method that simultaneously provide a high speed wireless LAN capability and a wireless ISDN capability within a group or private office. The invention allows the wireless telecommunication units to be interconnected to remote ISDN equipment via a PBX switching system or the public telephone network. Advantageously, the invention also provides for communication of information between the wireless LAN units and the remote ISDN equipment. This allows a local computer functioning as a wireless LAN unit to communicate with a remote computer interconnected to the public telephone network via ISDN facilities.

Further, the expense of hiding unsightly wiring in an office environment is avoided, and the cost of moves and rearrangements of equipment are greatly minimized. Furthermore, the present invention makes it possible to reuse radio frequency or photonic bandwidth repeatly because of the relatively small areas (such as a group or private office) serviced by each apparatus so that the maximum use is made of such bandwidth.

In an illustrative embodiment, the apparatus comprises a cell controller in each office, an ISDN interface in each telecommunication unit, and a LAN interface in each LAN unit. The ISDN and LAN interfaces allow the telecommunication and LAN units, respectively, to communicate by means of time division multiplexing utilizing a framing technique on a wireless medium. The LAN interfaces use only a portion of each frame to establish the required signaling and data transfer for a LAN system in order to communicate with each other using a LAN protocol. The remainder of each frame is allocated to time slots for implementing ISDN channels of an ISDN protocol. Each ISDN channel uses two time slots—one for receiving and one for transmitting data by the ISDN interfaces. Using information communicated by the time slots, the cell controller interconnects the telecommunication units to a telecommunication switching system such as a PBX or the public telephone network using the ISDN protocol. In addition, the cell controller determines which LAN units are to communicate with the telecommunication switching system, converts LAN protocol defined data from the determined LAN units to ISDN protocol defined data for transmission to the telecommunication switching system, and converts ISDN protocol defined data from the telecommunication switching system to LAN protocol defined data for transmission to the the determined LAN units.

Other and further aspects of the present invention will become apparent during the course of the following description and by reference to the accompanying drawing.

DETAILED DESCRIPTION

Figure 1:
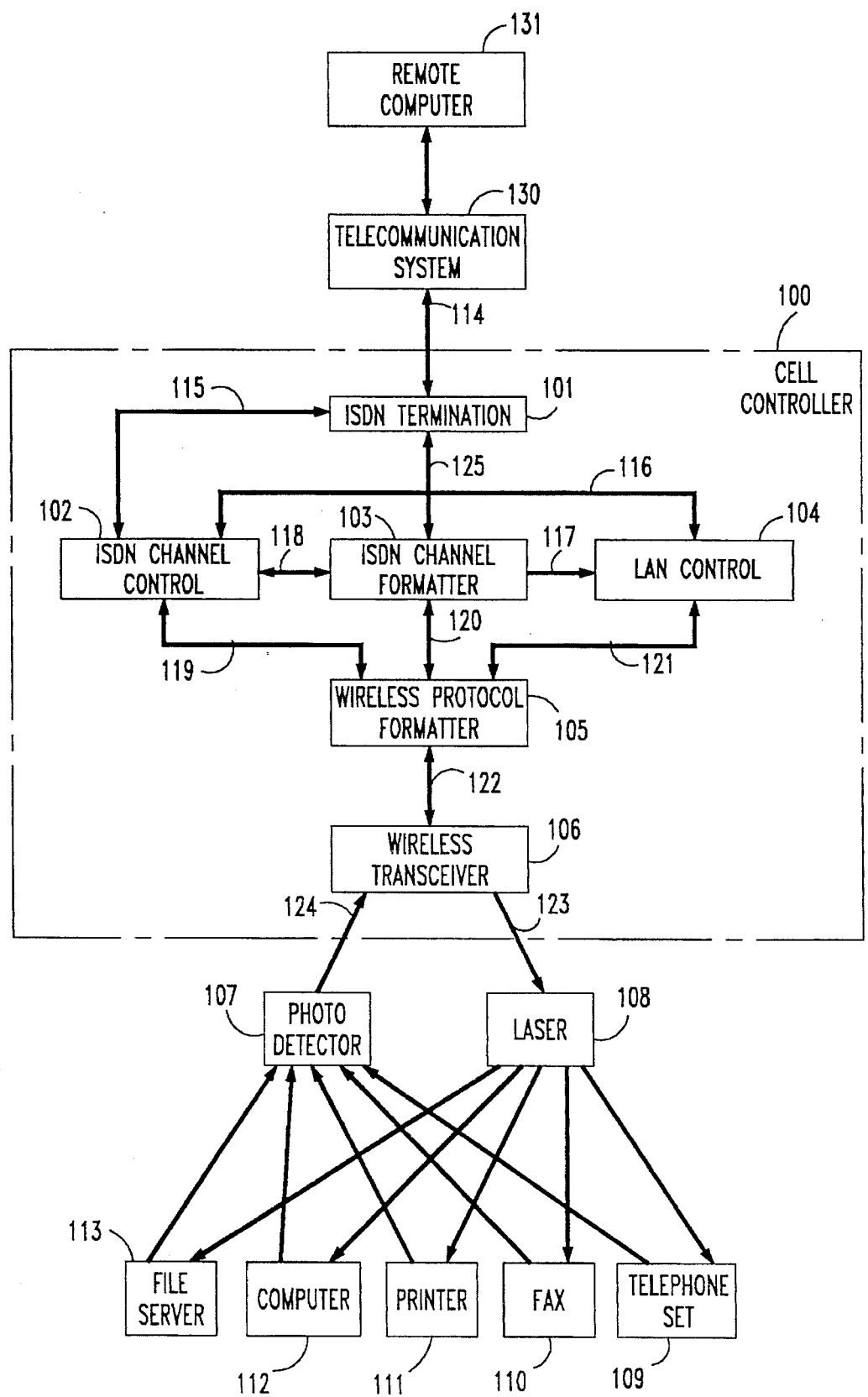
FIG. 1 illustrates, in block diagram form, a system embodying the inventive concept.

In the preferred embodiment of the present invention, the telecommunication and computer equipment is terminated using cell controllers such as cell controller 100 of FIG. 1 in each private office. Cell controller 100 is connected to telecommunication system 130 using the ISDN protocol via link 114 which maybe either a metallic cable or an optical fiber. Cell controller 100 communicates with units 109 through 113 using a photonic medium. Information is transmitted using a time division multiplexing in which all data is transmitted utilizing a framing technique. Henceforth, the frame is referred to as a wireless frame because it is communicated in a wireless manner. As will be discussed with respect to FIG. 4, the wireless frame is divided into time slots for transmitting ISDN protocol defined data with the remainder of the wireless frame being reserved for LAN protocol defined data.

Telephone set 109 and FAX 110 (telecommunication units) communicate voice and data information with telecommunication system 130 using the ISDN protocol. Computer 112, file server 113, and printer 111 (computer units) communicate data information among themselves using a LAN protocol. The LAN protocol is a carrier sensed multiple access with collision detection (CSMA/CD) protocol similar to the commonly used Ethernet protocol. However, the LAN protocol may advantageously be a token ring protocol, or any of the commonly used LAN protocols which provide fast access to the entire bandwidth of the LAN. In addition, units 111, 112, and 113 can communicate data information with remote computer 131 by cell controller 100 converting the LAN protocol to the ISDN protocol for communication via telecommunication system 130. Advantageously, it is possible for a unit to terminate both ISDN and LAN protocols. For example, computer 112 could terminate the ISDN protocol to allow computer 112 conventional access to a commercial database via telecommunication system 130 as well as access to the other computer units via the wireless LAN.

As illustrated in FIG. 1, link 114 is terminated by the ISDN termination 101. ISDN termination 101 is an ISDN basic rate interface (BRI) and interconnects cell controller 100 to telecommunication system 130. Link 114 is a BRI link, that communicates a bidirectional message-based signaling channel (D channel) for call control plus two bidirectional 64 kbps data channels (B channels) for voice or data transmission. Advantageously, ISDN termination 101 may also be an ISDN primary rate interface (PRI).

ISDN channel control 102 provides overall control of communication with telecommunication system 130 using D channel signaling. This communication is performed using the ISDN protocol and involves control of ISDN data or voice communication with telecommunication system 130 and direct control of ISDN channel formatter 103 and LAN control 104 for performing the conversion of ISDN protocol data to LAN protocol data and vice versa. With respect to D channel signaling messages received from telecommunication system 130, the D channel is separated from the B channels by ISDN termination 101, and D channel is sent over bidirectional path 115 to the ISDN channel control 102. ISDN channel control 102 can terminate the ISDN D channel signaling messages for controlling the B channels, can send the messages to the telecommunication units units unaltered for control of those units, or can use the messages to control ISDN channel control 102 and LAN control 104.

With respect to ISDN protocol data received from telecommunication system 130 in B channels, ISDN termination 101 transfers this data to the ISDN channel formatter 103 via bidirectional path 125. Under control of ISDN channel controller 102, formatter 103 routes the B channels via bidirectional path 120 to wireless protocol formatter 105 for insertion into the ISDN protocol time slots or routes the B channels via bidirectional path 117 to LAN control 104 for insertion into the LAN portion of a wireless frame.

With respect to ISDN protocol data transmitted to telecommunication system 130, ISDN channel formatter 103 receives the data in ISDN form via B channels from the telecommunication units via wireless protocol formatter 105 and path 120 or in LAN message form from LAN control 104 via path 117. If data is selected by ISDN channel control 102 for transmission via link 114 to telecommunication system 130, ISDN channel formatter 103 relays the received data in B channel form to ISDN termination 101. With respect to data from LAN control 104, ISDN channel formatter 103 formats this data into B channel form. The data received from LAN control 104 was received as LAN protocol defined data by LAN control 104.

Consider now in greater detail, the operation of LAN control 104 as illustrated in FIG. 1. Under control of ISDN channel control 102, LAN control 104 receives data from ISDN channel formatter 103, converts this data into LAN protocol defined data, and transmits this data via path 121 to wireless protocol formatter 105. LAN control 104 also receives LAN protocol defined data from wireless protocol formatter 105 and transmits this data via bidirectional path 117 to the ISDN channel formatter 103 for subsequent transmission to telecommunication system 130 as ISDN protocol data. To perform this function, LAN control 104 examines the addresses of all messages in the LAN portion of each wireless frame to determine which messages should be removed from the LAN for transmission to the ISDN channel formatter 103. The addresses are communicated from telecommunications system 130 by means of the ISDN D channel to ISDN channel control 102 which transfers them to LAN control 104. LAN control 104 also examines the addresses of all messages given to it by ISDN channel control 102 to verify that they are appropriately addressed for one of computer units 109 through 113.

The purpose of wireless protocol formatter 105 is to format the ISDN B channels, ISDN D channel, and the LAN data into a wireless frame to be communicated in a bidirectional sense with the units 109 through 113. The details of this wireless frame are described in detail with respect to FIG. 4. The formatted data is transmitted to wireless transceiver 106 over bidirectional path 122.

Wireless transceiver 106 is designed to receive signals from the photo detector 107 over path 124 and appropriately amplify and digitize the signals. Photo detector is converting optical signals to electrical signals. Similarly, wireless transceiver 106 must amplify and place signals into the appropriate electrical form to drive laser 108 via path 123 to generate optical signals. A light emitting diode could also be used in place of laser 108. Further, a radio frequency receiver and transmitter could advantageously be used in place of elements 107 and 108, respectively.

Figure 2:
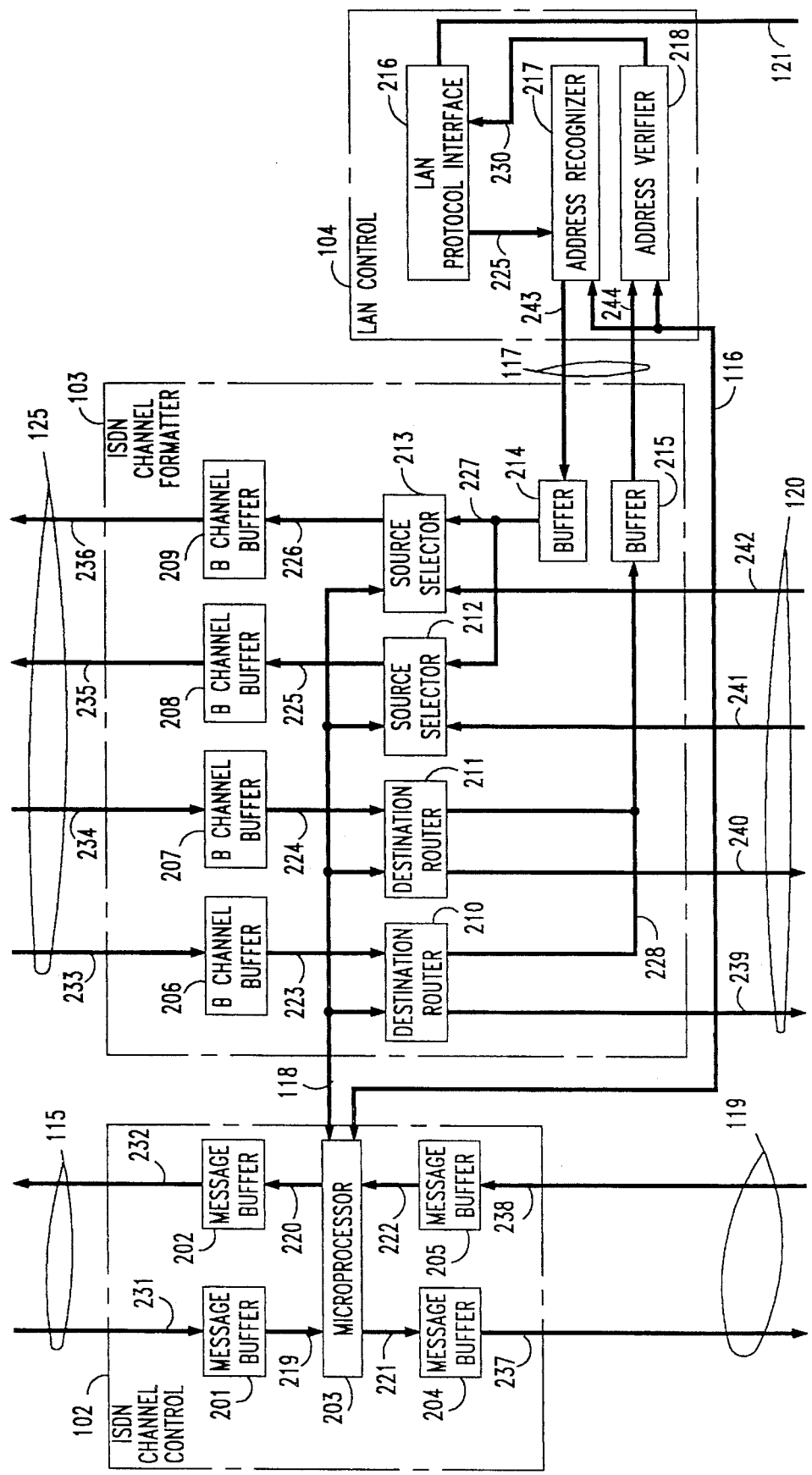
FIG. 2 illustrates, in greater detail, the cell controller of FIG. 1

FIG. 2 illustrates, in greater detail, ISDN channel control 102, ISDN channel formatter 103 and LAN control 104. ISDN channel control 102 receives and transmits control messages with telecommunication system 130 over a D channel via path 115 by means of buses 231 and 232 as illustrated in FIG. 2. Control messages from the D channel are stored in message buffer 201 until microprocessor 203 can process them, at which time they are communicated to microprocessor 203 via bus 219. Microprocessor 203 is programmed to interpret these messages as being directed to itself, to pass these control messages on to the telecommunication units transparently, or to use these control messages to control the operation of ISDN channel formatter 103 and LAN control 104. Microprocessor 203 sends D channel messages to telecommunication system 130 via bus 220 to message buffer 202 which subsequently sends the messages to ISDN termination 101 of FIG. 1 via bus 232 of path 115. Similarly, D channel messages from telecommunication units 109 and 110 are received by microprocessor 203 via bus 222, and message buffer 205. These D channel messages are received from the telecommunication units 109 and 110 via photo detector 107, the wireless transceiver 106, and the wireless protocol formatter 105.

With respect to D channel messages received by microprocessor 203 from telecommunication system 130 for transfer to telecommunication units 109 and 110, these D channel messages are transmitted by microprocessor 203 over path 221 to message buffer 204 which communicates them to the wireless protocol formatter 105 over conductor 237 of cable 119. These messages are subsequently communicated to telecommunication units 109 through 110 by means of the wireless transceiver 106 and laser 102.

Microprocessor 203 is also connected to ISDN channel formatter 103 via bus 118 and LAN control 104 via bus 116. Microprocessor 203 controls the flow of information communicated between ISDN terminator 101, ISDN channel formatter 103 and LAN control 104. As described in greater detail with respect to FIG. 4, each ISDN channel has assigned to it a pair of times slots in the ISDN portion of wireless frame. One time slot is used to transmit information from cell controller 100 to telecommunication units 109 and 110, and the another time slot is used to transmit information to cell controller 100 from telecommunication units 109 and 110. In controlling ISDN channel formatter 103, microprocessor 203 selects each ISDN B channel to be sent to telecommunication system 130 by selecting a ISDN time slot from a telecommunication unit received via buses 241 and 242 as a source or by selecting a LAN message received via buffers 214 and 215 as a source. Microprocessor 203 controls the selection by transmitting the required control information to source selectors 212 and 213 over bus 118. Similarly, microprocessor 203 must select whether the the ISDN B channel information received from telecommunication system 130 is routed to the units by means of the B channel time slots in the wireless frame or by means of the LAN portion of the wireless frame. Microprocessor 203 controls this selection by sending the appropriate control signals over path 118 to the destination routers 210 and 211 of ISDN channel formatter 103.

With respect to ISDN channel formatter 103, the latter formatter receives B channel information from the ISDN termination 101 over buses 233 and 234 of path 125. This information is temporarily stored in B channel buffers 206 and 207. One B channel buffer is required for each B channel received from telecommunication system 130, so that for a BRI interface two such buffers are required for each direction of communication. For information transmitted to telecommunication system 130, buffers 208 and 209 are used to buffer information and are interconnected to ISDN termination 101 by means of buses 235 and 236 of path 125.

Within ISDN channel formatter 103, buffers 214 and 215 buffer messages to and from LAN control 104. Buffer 214 receives complete messages over path 117 from the LAN control 104 and dispenses them via path 227 to source selectors 213 and 212 for synchronization with the B channels of BRI link 114. Similarly, buffer 215 takes messages in synchronous byte form via path 228 from destination routers 210 and 211 and sends the information as high speed continuous messages to LAN control 104. The B channel information intended for the ISDN time slots of the wireless frame is communicated to the wireless protocol formatter 105 over buses 239 and 240 of path 120. Similarly, the ISDN time slot information coming from the B channel time slots of the wireless frame is communicated to ISDN channel formatter 103 from wireless protocol formatter 105 via buses 241 and 242 of cable 120.

Turning now to LAN control 104, the latter control functions as another computer unit with respect to the LAN portion of the wireless frame. Note that information communicated using the LAN protocol between computer units 111, 112, and 113 is not controlled by LAN control 104. Further, LAN control 104 converts ISDN protocol information to and from the LAN protocol information. LAN protocol interface 216 communicates the LAN protocol messages over path 121 with wireless protocol formatter 105 of FIG. 1. These are messages communicated between LAN control 104 and the computer units. To communicate LAN messages to ISDN B channels, LAN protocol interface 216 transmits messages to address recognizer 217 over path 229. Using addresses received from ISDN channel control 102, address recognizer 217 determines if a message has an appropriate address to be placed in one of the B channels of link 114. If the determination is yes, address recognizer 217 subsequently transmits the entire message to buffer 214 of the ISDN channel formatter 103 over bus 243. Alternatively, if address recognizer 217 determines that the message does not have the appropriate address to be placed on one of the B channels of path 114, address recognizer 217 does not communicate the message to message buffer 214.

Similarly, address verifier 218 receives messages from B channels via buffer 215 over bus 244 of path 117 from ISDN channel formatter 103. Address verifier 218 transmits the messages having valid computer unit addresses via path 230 to LAN protocol interface 216. Messages not having valid computer unit addresses are destroyed and not transmitted to LAN protocol interface 216.

Figure 3:
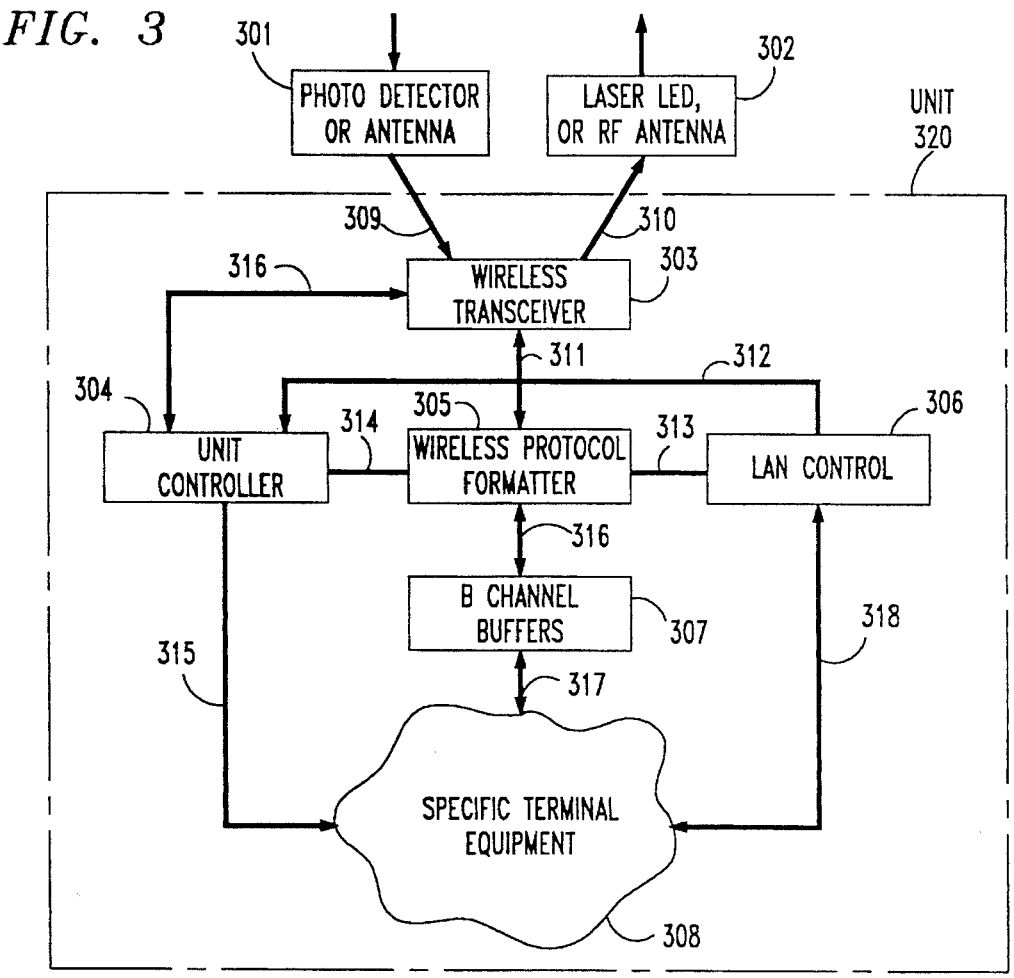
FIG. 3 illustrates, in greater detail, a computer or telecommunication unit in accordance with the inventive concept.

Unit 320, which is illustrated in FIG. 3, is a combined telecommunication and computer unit and has the capabilities to communicate information using either the ISDN or LAN protocol. It would be obvious to one skilled in the art to modify FIG. 3 to provide only ISDN or LAN protocol capabilities. Unit 320 receives information from cell controller 100 by photo detector 301 detecting the wireless frames. This information is delivered over conductor 309 to wireless transceiver 303 where information is amplified and converted to digital form. Unit 320 transmits information to cell controller 100 by laser 302 transmitting the information as a wireless frame.

Wireless transceiver 303 separates the D channel control information received via path 309 from the B channel information and extends the D channel information to unit controller 304 over bus 318. Wireless transceiver 106 also extends the separated B channel information to wireless protocol formatter 305 via path 311. Unit controller 304, wireless protocol formatter 305, and LAN control 306 are substantially similar to ISDN channel controller 102, ISDN channel formatter 103, and LAN control 104, respectively. B channel registers 307 buffer the B channel information going to and from specific terminal equipment 308 via path 317. Similarly, control is passed between specific terminal equipment 308 and the unit controller 304 over path 315, and the LAN data is passed between specific terminal equipment 308 and LAN control 306 over path 318.

Whereas, unit 320 is equipped to handle both B channel information and LAN information, a cost reduction can be accomplished by eliminating unneeded portions of unit 320. For example, telephone set 109 does not need the LAN control portion, and printer 111 does not need the B channel capability illustrated in FIG. 3.

Figure 4:
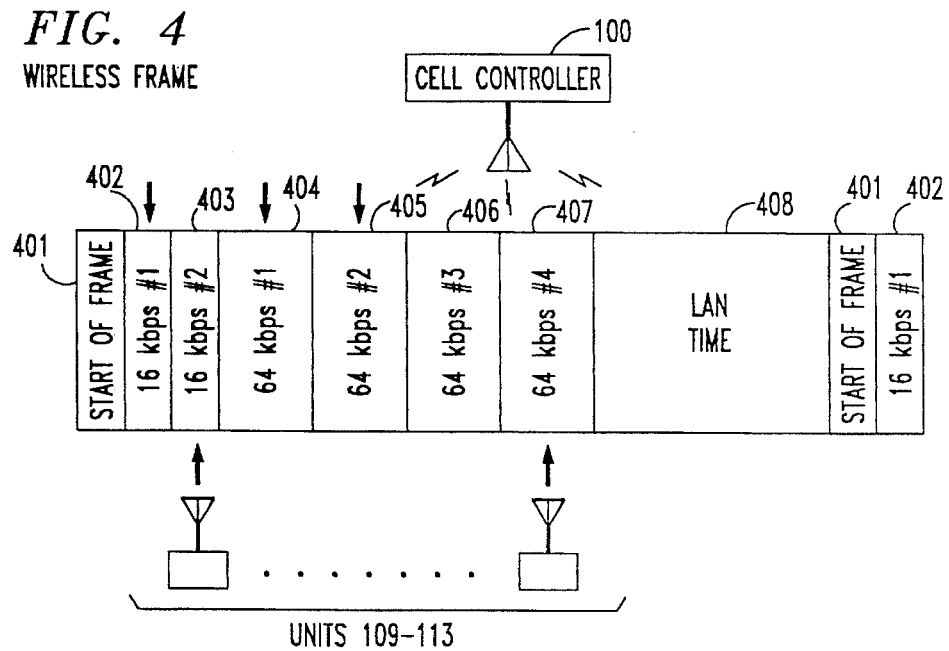
FIG. 4 illustrates a wireless frame in accordance with the inventive concept.

The wireless frame is shown in FIG. 4. Cell controller 100 is responsible for creating the wireless frame and communicating the wireless frame to all units associated with cell controller 100. Cell controller 100 and units 109 through 113 determine when it is possible to receive information or to transmit information during a wireless frame. The first element of the wireless frame is the start of frame pattern 401. This is a frame synchronization bit pattern whose design is well known in the art. Next, time slots 402 and 403 are 16 kbps time slots and are used for D channel signaling. Time slot 402 is used for signaling in the direction of the cell controller 100 from units 109 and 110, and time slot 403 is used for signaling in the direction of the units 109 and 110 from cell controller 100. Time slots 404 through 407 are 64 kbps ISDN B channels. B channels time slots 404 and 405 are used to transmit data to telecommunication units 109 and 110 from cell controller 100. B channels time slots 406 and 407 are used to communicate information to the cell controller 100 from the units 109 and 110.

LAN time slot 408 is used to transmit the LAN information. By using the contention scheme, LAN control 104 and units 111 through 113 contend for the bandwidth and utilize the bandwidth according to the rules of the contention scheme. The capacity of LAN time 408 is typically significantly greater than the capacity of the ISDN time slots. This allows the more expensive computer units to transmit at high rates and the less expensive telecommunication units to transmit at lower rates for cost and performance optimization. After LAN time 408, the wireless frame is repeated.

In the present embodiment as illustrated in FIG. 4, time slots 402 through 408 are fixed with respect to position and duration. It would be obvious to those skilled in the an that LAN time slot 408 and ISDN time slots 402–407 could be interchanged. Further, those skilled in the an could devise the necessary circuitry (using the teachings of U.S. Pat. No. 4,731,785) such that if not all the ISDN channels were active, LAN time slot 408 could be increased in duration since some of time slots 402 through 407 would not be active.

Additionally, the circuitry disclosed herein is, of course, merely illustrative. Indeed, although the various functional blocks disclosed herein are depicted as discrete circuitries, those various functions could be carried out using one or more programmed processors or digital signal processing (DSP) chips.

Those skilled in the an will recognize that the present invention could be implemented using code division multiple access (CDMA) or frequency division multiple access (FDMA) techniques without violating the principles of the present invention. In addition, those skilled in the an would also recognize that the invention could be implemented using other telecommunication protocols including telecommunication protocols similar to the ISDN standards but not conforming to the ISDN standards as defined by telecommunication standards organizations.

We claim:

1. An apparatus for simultaneously supporting communication among telecommunication units responsive to a telecommunication protocol and other units responsive to another protocol, comprising:

means in each of said telecommunication units for communicating telecommunication-protocol-defined data in a first portion of one of a plurality of frames communicated via a wireless medium;

means in each of said other units for communicating other-protocol-defined data in a second portion of said one of said plurality of frames;

means for determining first telecommunication-protocol-defined data and first other-protocol-defined data to be communicated with a telecommunication system;

means for converting said determined first other-protocol-defined data to telecommunication-protocol-defined data and the converted determined first other-protocol-defined data with said first telecommunication system;

means for determining second telecommunication-protocol-defined data that is to be communicated directly to a one of the telecommunication units;

means for directly communicating the determined second telecommunication-protocol-defined data to the one of the telecommunication units;

means for determining second other-protocol-defined data that is to be communicated directly to a one of the other units; and means for directly communicating the determined second other-protocol-defined data to the one of the other units.

2. The apparatus of claim 1 wherein said first portion of said one of said plurality of frames comprises two time slots for each telecommunication protocol channel used by said telecommunication units.

3. The apparatus of claim 2 wherein said second portion of said one of said plurality of frames provides both data and control signaling for said other units in accordance with said other protocol.

4. The apparatus of claim 3 wherein said wireless medium is a photonic transmission medium.

5. The apparatus of claim 3 wherein said wireless medium is a radio transmission medium.

6. An apparatus for simultaneously supporting communication among telecommunication units using an ISDN protocol and LAN units using a LAN protocol, comprising:

means in each of said telecommunication units for communicating ISDN-protocol-defined data in a first portion of one of a plurality of frames communicated via a wireless medium;

means in each of said LAN units for communicating LAN-protocol-defined data in a second, portion of said one of said plurality of frames;

means for determining first ISDN-protocol-defined data and first LAN-protocol-defined data to be communicated with a telecommunication system;

means for converting said determined first LAN-protocol-defined data to ISDN-protocol-defined data for communication with said telecommunication system;

means for communicating the determined first ISDN data and the converted determined first LAN-protocol-defined data with said telecommunication system;

means for determining second ISDN-protocol-defined data that is to be communicated directly to a one of the telecommunication units;

means for directly communicating the determined second ISDN-protocol-defined data to the one of the telecommunication units;

means for determining second LAN-protocol-defined data that is to be communicated directly to a one of the other units; and means for directly communicating the determined second LAN-protocol-defined data to the one of the other units.

7. The apparatus of claim 6 wherein said first portion of said one of said plurality of frames comprises two time slots for each ISDN channel used by said telecommunication units.

8. The apparatus of claim 7 wherein said second portion of said one of said plurality of frames provides both data and control signaling for said LAN units in accordance with said LAN protocol.

9. The apparatus of claim 8 wherein said wireless medium is a photonic transmission medium.

10. The apparatus of claim 8 wherein said wireless medium is a radio transmission medium.

11. A method for simultaneously supporting communication among telecommunication units responsive to a telecommunication protocol and other units responsive to another protocol, comprising the steps of:

communicating by each of said telecommunication units telecommunication-protocol-defined data in a first portion of one of a plurality of frames communicated via a wireless medium;

communicating other-protocol-defined data by each of said other units in a second portion of said one of said plurality of frames;

determining first telecommunication-protocol-defined data and first other-protocol-defined data to be communicated with a telecommunication system;

converting said determined first other-protocol-defined data to telecommunication-protocol-defined data for communication with said telecommunication system;

communicating the determined first telecommunication-protocol-defined data and the converted determined first other-protocol-defined data with said telecommunication system;

determining second telecommunication-protocol-defined data that is to be communicated directly to a one of the telecommunication units;

directly communicating the determined second telecommunication-protocol-defined data to the one of the telecommunication units;

determining second other-protocol-defined data that is to be communicated directly to a one of the other units; and directly communicating the determined second other-protocol-defined data to the one of the other units.

12. The method of claim 11 wherein said first portion of said one of said plurality of frames comprises two time slots for each telecommunication protocol channel used by said telecommunication units.

13. The method of claim 12 wherein said second portion of said one of said plurality of frames provides both data and control signaling for said other units in accordance with said other protocol.

14. The method of claim 13 wherein said wireless medium is a photonic transmission medium.

15. The method of claim 13 wherein said wireless medium is a radio transmission medium.

16. A method for simultaneously supporting communication among telecommunication units using an ISDN protocol and LAN units using a LAN protocol, comprising the steps of:

communicating by each of said telecommunication units ISDN-protocol-defined data in a first portion of one of a plurality of frames communicated via a wireless medium;

communicating by each of said LAN units LAN-protocol-defined data in second portion of said one of said plurality of frames determining first ISDN-protocol-defined data and first LAN-protocol-defined data to be communicated with a telecommunication system;

converting said determined LAN-protocol-defined data to ISDN-protocol-defined data for communication with said telecommunication system;

communicating the determined first ISDN-protocol-defined data and the converted determined first LAN-protocol-defined data with said telecommunication system;

determining second ISDN-protocol-defined data that is to be communicated directly to a one of the telecommunication units;

directly communicating the determined second ISDN-protocol-defined data to the one of the telecommunication units;

determining second LAN data that is to be communicated directly to a one of the other units; and directly communicating the determined second LAN data to the one of the other units.

17. The method of claim 16 wherein said first portion of said one of said plurality of frames comprises two time slots for each ISDN channel used by said telecommunication units.

18. The method of claim 17 wherein said second portion of said one of said plurality of frames provides both data and control signaling for said LAN units in accordance with said LAN protocol.

19. The method of claim 18 wherein said wireless medium is a photonic transmission medium.

20. The method of claim 18 wherein said wireless medium is a radio transmission medium.

* * * * *